(12) United States Patent
Molnar et al.

(10) Patent No.: US 6,675,246 B1
(45) Date of Patent: Jan. 6, 2004

(54) SHARING ARBITER

(75) Inventors: Charles E. Molnar, deceased, late of Sunnyvale, CA (US), by Donna A. Molnar, executrix; Ian W. Jones, Palo Alto, CA (US); Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 586 days.

(21) Appl. No.: 09/667,118

(22) Filed: Sep. 20, 2000

(51) Int. Cl.[7] .................. G06F 13/38; G06F 13/14; G06F 12/00; G06F 13/00; G06F 13/36; G06F 13/368

(52) U.S. Cl. ............ 710/240; 710/107; 710/113; 710/119; 710/309; 710/241; 710/242; 710/243; 710/244

(58) Field of Search ................... 710/220–244, 710/309, 107–125

(56) References Cited

U.S. PATENT DOCUMENTS 5,638,009 A * 6/1997 Sutherland et al. ........... 326/83
5,805,838 A * 9/1998 Sutherland et al. ......... 710/112
6,072,805 A * 6/2000 Molnar et al. .............. 370/462

OTHER PUBLICATIONS

Ordered Arbiters, Bystrov, A.; Yakovlev, A.; Electronics Letters, vol.: 35, Issue: 11, May 27, 1999, pp. 877–879.*

* cited by examiner

Primary Examiner—Glenn A. Auve
Assistant Examiner—Trisha Vu
(74) Attorney, Agent, or Firm—Townsend and Townsend and Crew LLP; Philip H. Albert

(57) ABSTRACT

The Sharing arbiter is an arbiter which, under certain conditions, permits two or more Done signals to be received before the Sharing arbiter issues a grant signal and, under certain conditions, is permitted to issue more than one grant signal before receiving a Done signal. A Sharing arbiter can be implemented by adding a queue onto the Done input of a Sequencer arbiter. In a Sharing arbiter with a Sharing-number of N and K request inputs, the Sharing arbiter is permitted to issue M grant signals concurrently if M input requests have been received (where $M \leq K$ and $M \leq N$) without enforcing mutual exclusion between the grants if at least M Done signals have also been received. Where less than M Done signals have been received (P Done signals, for example), the Sharing arbiter arbitrates among the M input requests and is permitted to issue P grant signals concurrently.

30 Claims, 12 Drawing Sheets

SHARING ARBITER

BACKGROUND OF THE INVENTION

Embodiments of this invention relate to the subject of arbitration in electronic circuits, and particularly to arbitration in asynchronous systems.

Because events in asynchronous systems may occur at any time, it is often necessary to choose an action that depends on which of two, or more, sometimes nearly simultaneous events is to be treated first. Devices that make such choices are commonly called arbiters. Arbiters are often used in situations where most of the time the two input events arrive with a relatively large time separation, and it is then easy to make a clean decision as to which event arrived first—we call this situation "an uncontested input request". Only infrequently do the two input requests arrive nearly simultaneously, and it is in these circumstances that the arbiter really has to work for a living and make a clean decision as to which input has arrived first.

A block diagram of a typical arbiter is shown in FIGS. 1A and 1B. The arbiter of FIG. 1A has five terminals and is therefore sometimes called a "five-wire" arbiter. It is often used to sequence events and so is frequently called a "Sequencer arbiter" or "Sequencer". The Sequencer arbiter receives signals on the two request inputs R1, R2 and issues signals on the two grant outputs G1, G2. The arbiter also receives signals on the "Done" input D.

Many different encodings of the input and output signals of arbiters are possible. For example, each rising transition of an electrical voltage on a wire might be used to signal the event. The signal could also be encoded as a falling transition, or any other change in a voltage, current, light level or similar phenomena. Electrical or other forms of pulses may also be used to encode events.

However the signal is encoded, the arbiter monitors the request inputs and, when a signal is received on one request input, the arbiter sends a signal on the corresponding grant output, unless a grant is already outstanding. A grant is outstanding when one grant signal has been issued but a Done signal has not been received. Where two request signals are received substantially simultaneously, the arbiter unambiguously chooses one of the requests and issues a grant signal on the grant output corresponding to the chosen request. When a Done signal is received, a grant for the unchosen request is issued.

In this way, an arbiter can arbitrate contending accesses to a resource. Two principal forms of arbiter known in the art are the Sequencer arbiter and the RGD arbiter.

The first form of prior art arbiter, the Sequencer arbiter, mentioned above is sometimes also called a "Sequencer". The communication channel between the Sequencer arbiter and each of its users has a pair of event signals called Request and Grant, and a common Done event signal is shared by all of the users. For two channels, a Sequencer arbiter has five connections and is sometimes referred to as a "five-wire" arbiter, as explained above. A typical Sequencer arbiter is shown in FIG. 1A. Herein we refer to the five event signals of a Sequencer arbiter as R1, G1, R2, G2 and D.

The second form of prior art arbiter is the Request, Grant, Done (RGD) arbiter. As its name implies, the communication channel between the RGD arbiter and each of its users has three event signals called Request, Grant and Done, on each of its channels. An RGD arbiter that arbitrates among two channels will have six event signals, three for the first channel of communication (R1, G1, D1), and three for the second channel of communications (R2, G2, D2). The numerical designation identifies the communication channel, and thus the user.

The dot by the D input in FIG. 1A is used to indicate the initial state of the arbiter and signifies that the arbiter is initialized as if an input has been received on the D input.

FIG. 1B shows an RGD arbiter. The dot between the D1 and D2 inputs indicates that the arbiter is initialized as if a Done input event has been received on either input D1 or input D2, and that upon the receipt of a request input the arbiter can issue a grant signal.

For both types of arbiters—Sequencer arbiters and RGD arbiters—the request event signals (R1 and R2) and Done event signals (D or D1 and D2) are input signals, while the grant event signals (G1 and G2) are output signals.

The arbiter action in both the above prior art arbiters controls when the arbiter will issue grant signals. The intent of arbitration implies that the arbiter will issue only one grant signal "at a time." In asynchronous systems, however, the notion of "at a time" must be made more explicit. For the RGD arbiter the conventional rule is that after issuing a grant signal G1 in response to a request R1, the arbiter will issue no further grant signals, G1 or G2, until it receives the Done signal D1. The Done signal indicates that whatever action was to occur on that first channel is complete. Thus for the RGD arbiter, after a first request R1 on channel 1, and after that channel is given a grant G1, a following request on channel 1 or a request on channel 2 the arbiter must wait for the Done signal D1 before the arbiter can issue a grant signal, either a G1 or a G2 respectively. This second grant signal is delayed until channel 1 has finished its action in response to the first grant signal on channel 1 and so indicated via the Done signal D1. For the Sequencer arbiter the rule is similar. In the Sequencer arbiter, however, both channels indicate completion with the same common Done signal D. Because only one channel can have an outstanding grant, there is no ambiguity, upon receipt of a Done signal D, regarding which channel indicated a completion.

The Sequencer arbiter and the RGD arbiter are closely related. It is known that one can build a Sequencer arbiter using an RGD arbiter (in addition to other components well known in the art) and vice versa.

Basic to most forms of arbiter is a mutual exclusion (ME) element. The mutual exclusion element is a circuit that executes the RGD arbiter function using a particular communication protocol—four-phase, return to zero signaling. A mutual exclusion element for a two-channel arbiter has two input terminals and two output terminals, with one input terminal and one output terminal associated with each channel. For the first channel, a rising transition on its input terminal signifies request, R1, and a falling transition on that same terminal signifies Done, D1. The ME element signals a corresponding grant with a rising transition on its G1 output channel. A falling transition on the G1 output channel has no significance. Thus, the mutual exclusion element is an RGD arbiter with a particular encoding of communication signals. Mutual exclusion elements commonly form the basis for RGD and Sequencer arbiters that use other communication protocols. The mutual exclusion element is not only a basis for RGD and Sequencer arbiters, but is also useful as a basic element in synchronizers. A synchronizer captures the value of an external signal for use in a synchronous system, ensuring that the captured form of the external signal remains stable during the interval in each clock cycle during which stability is required. The art of designing synchronizers and mutual exclusion elements is well known. See, for example, "Introduction to VLSI Systems", Chapter 7 [FIG. 7.25 and pages 260–61 in particular] (1980), which is incorporated herein by reference for all purposes.

Arbiters are used to make choices that depend upon the order in which requests reach the arbiter. For example, arbiters can be used to implement a "first-come, first-served" policy for sequencing access to a common resource. In a typical implementation, a second requester will not be issued a grant signal until service of a first grant to a first requester is complete, as indicated by the receipt of a Done signal.

The behavior of the Sequencer arbiter shown in FIG. 1 can be represented by the eight-state diagram shown in FIG. 2. State 1 is the initial state, which is indicated by using a circle that is thicker than those representing other states. The state of the arbiter changes based on signals it receives and signals it issues. For example, if a request is received on R1, there is a transition to state 2; or if a request is received on R2, there is a transition to state 3. A grant can be issued from three of the four upper-level of states (2, 3, 4), which results in a transition to one of the lower-level states (5, 6, 7). If a Done signal, D, is received when in one of the lower-level states, the arbiter "transitions" to an upper-level state. A state transition is designated here by the notation "→" between two state labels. For example, "1→2" refers to the transition from state 1 to state 2. Using this notation, the transitions which can result from receipt of request signal R1 are 1→2, 3→4, 5→6 and 7→8; and for R2 are 1→3, 2→4, 5→7 and 6→8. The transitions which can result following a grant signal G1 are 2→5 and 4→7; and following a grant signal G2, are 3→5 and 4→6. The transitions resulting from a Done signal being received are 5→1, 6→2, 7→3 and 8→4. The arbitration function of the arbiter is only needed when the arbiter is in state 4; i.e., where the arbiter has received both an R1 and an R2 signal and must decide whether to issue a G1 grant or a G2 grant.

FIG. 3 is a projection of the state diagram of FIG. 2 onto the alphabet {G1, G2, D}. This state diagram has two states labeled "0" and "1". The state numbers "0" and "1" have been chosen such that they also represent the number of grant signals which can be issued when the arbiter is in that state. Thus the Done signal D from state "0" to state "1" changes the number of grants that the arbiter is permitted to issue from 0 to 1. In other words: in state 0, no grant signals can be issued until a Done signal is received. The Done signal results in a transition to state 1, wherein one grant signal either G1 or G2—can be issued, resulting in a transition back to state 0. According to the convention established in FIG. 2, state 1 is the initial state.

As can be seen in the state diagrams of FIGS. 2–3, conventional arbiters require a Done signal following a grant signal before a second grant signal can be issued. This is an undesirable constraint when the common resource whose requests for access are being arbitrated can frequently handle more than one access concurrently, but occasionally can handle only a single access at a time.

U.S. Pat. No. 5,638,009 issued to Sutherland (hereinafter "Sutherland"; that patent is incorporated by reference herein for all purposes) teaches arbiters adapted to operate using a Three-wire event encoding scheme that, in a way, allows an arbiter to handle receipt of two Done events without an intervening grant signal. However, such an arbiter is limited to storing only one Done event when this Three-wire signaling protocol is used. More generally, such an arbiter that uses an N-wire signaling protocol can store N−1 Done events as pending signals on the Done input wires. Such an approach to storing Done events is limited, since N-wire signaling with N>3 is complex, because the size of the arbiter increases as $N^2$. In most applications, single-wire signaling is sufficient, and even Three-wire signaling uses much more logic and results in slower speed and greater design effort going into the circuit than is necessary.

SUMMARY OF THE INVENTION

Embodiments of a Sharing arbiter according to the present invention provide a technique and a system for issuing grants in response to requests where more than one grant is allowed to be outstanding at one time, representing a situation in which a resource can be accessed—in some cases—by more than one user.

In a specific embodiment, the Sharing arbiter is implemented by a Sequencer arbiter and a queue coupled to the Done input of the Sequencer arbiter. For an N-Sharing arbiter, i.e., one that allows up to, but no more than, N grants to be outstanding at one time, the queue has N−1 stages. Optionally, a Done Acknowledge output signal is provided to give external confirmation that a Done signal has been accepted by the queue. The queue can be preloaded with one or more Done signals if desired. A Sharing arbiter can, under certain conditions, act as a conventional arbiter and can have at most one grant outstanding while, under other conditions when its environment permits by sending the arbiter additional Done signals, it can issue more than one grant concurrently and thus can have more than one grant outstanding.

One application of the Sharing arbiter is to control accesses to a multi-port process, such as a dual-port memory. More generally, in this application, the Sharing arbiter is arbitrating access from multiple users to a single resource (or from multiple users to a plurality of resources that are contended for among the multiple users). Another application of the Sharing arbiter is to control task assignments from a task source to a plurality of processors or other task handlers. More generally, in this application, the Sharing arbiter is efficiently allocating objects among multiple recipients of those objects.

The Sharing arbiter is an arbiter which, under certain conditions, permits two or more Done signals to be received before issuing a grant signal and, under certain conditions, the Sharing arbiter is permitted to issue more than one grant signal before receiving a Done signal. If the Sharing arbiter has a Sharing-number N and K request inputs, and M input requests have been received (where $M \leq K$ and $M \leq N$), and if P (where $P \geq M$) Done signals have also been received, the Sharing arbiter is permitted to issue M grant signals concurrently without enforcing mutual exclusion between the grants. If P Done signals have been received, and P<M, then the Sharing arbiter arbitrates among the M input requests and is permitted to issue up to P grant signals concurrently.

A further understanding of the nature and advantages of the inventions herein may be realized by reference to the remaining portions of the specification and the attached drawings.

DESCRIPTION OF THE SPECIFIC EMBODIMENTS

Figure 1A:
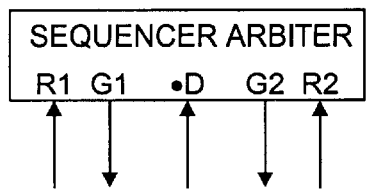
FIG. 1A is a block diagram of a prior art Sequencer arbiter.
Figure 3:
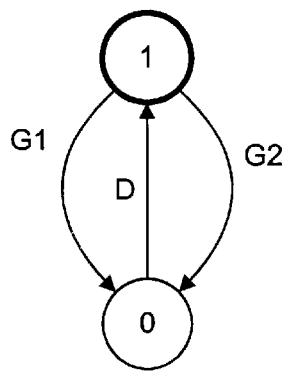
FIG. 3 is a projection of the state diagram of FIG. 2 onto a reduced alphabet.
Figure 1B:
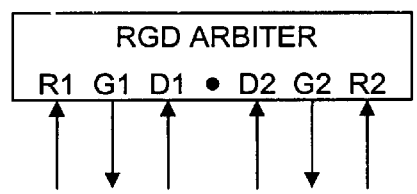
FIG. 1B is a block diagram of a prior art RGD Arbiter.
Figure 2:
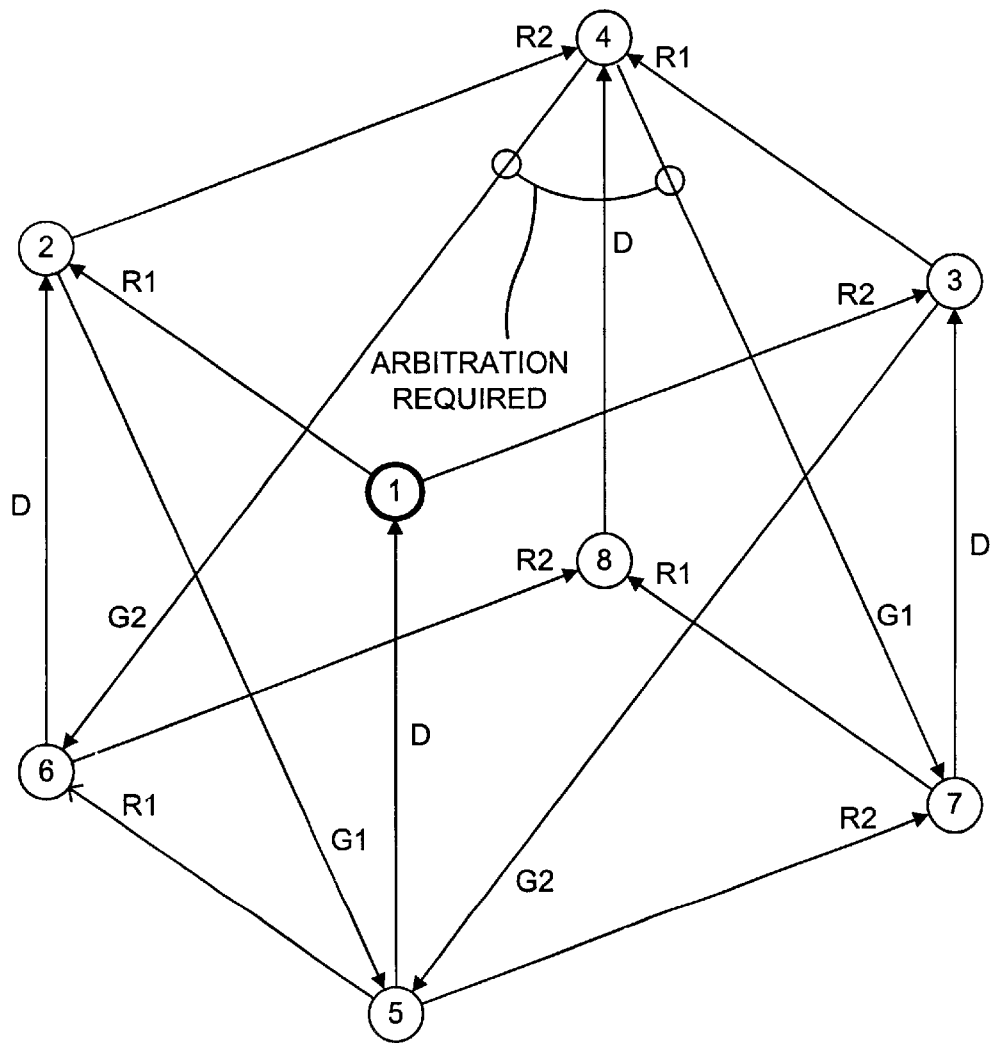
FIG. 2 is a state diagram for the Sequencer arbiter shown in FIG. 1A.

In a conventional arbiter, Done and grant signals alternate such that a Done signal must be received between two consecutive grant signals (only one outstanding grant at a time), and a grant signal must be issued between two Done signals (only one outstanding grant can "complete" if only one outstanding grant exists). In contrast, a Sharing arbiter according to the present invention does not have such constraints. A Sharing arbiter is characterized by a Sharing-number, N, such that the arbiter will issue up to N grant signals before requiring a Done signal (prerequisite to issuing further grant signals) and will accept up to N Done signals before needing to issue a grant signal.

Of course, if the Sharing arbiter is in a state in which it has already accepted a number of Done signals or has issued a number of grant signals, the arbiter might not be able to issue N more grants or accept N more Done signals. N can be any integer larger than one. (N can also be one, but that results in the trivial case of a conventional arbiter). Generalizing further, a Sharing arbiter is an arbiter which has an initial state in which the receipt of M Done signals is implied, where the arbiter can accept N–M additional Done signals ($0 \leq M \leq N$, $N>1$) before either issuing a grant signal, or when no further Done signals will be accepted. Such a Sharing arbiter, where M Done signals have been received, can issue up to M grant signals before requiring the receipt of a Done signal.

In some applications it makes more sense to describe the Sharing arbiter in terms of just when a grant signal will be issued. For other applications it makes more sense to describe the Sharing arbiter in terms of just when a Done signal can be accepted. It should be apparent, however that, regardless of application, the same Sharing arbiter is being described. The latter case is equivalent to having a Sharing arbiter in which a Done signal corresponding to a particular grant signal is received before that grant signal is issued. The message associated with this Done signal has now changed slightly from "the recipient has completed service of a particular request" to "the recipient is ready to receive a new request."

One application that can be described in terms of grant signals relates to using the Sharing arbiter to arbitrate among multiple requesters for access to a resource which cannot itself handle requests from all the possible requesters that might be making a request at any given time. Here, a grant signal represents grant of an access, while a Done signal represents closure, or cancellation, of the grant. Therefore, each unmatched, or outstanding, grant signal represents an existing grant of access.

Used in this way, requestors request access to the resource by issuing a request signal and the arbiter issues a grant signal in response. Each requestor is not permitted to carry out the access itself until it receives the grant signal corresponding to its request signal. Following the access, the requester, or the resource, issues a Done signal to the arbiter, indicating that the resource is no longer needed. If the resource is one that can accommodate more than one access at a time, a Sharing arbiter might then be used to arbitrate access. The Sharing number, N, of the arbiter is set to the maximum number of concurrent accesses that the resource can accommodate. With an initial state of the Sharing arbiter in which no access has been granted and, N Done signals have been received, the Sharing arbiter can issue up to N grant signals in response to request signals without needing further Done signals.

An application that can be described in terms of Done signals is one in which the Sharing arbiter distributes tasks. In this application, request signals are requests for work from a task handler, such as a processor. Grant signals are task assignment signals and a Done signal from a task assignor indicates that another task is available to be assigned. In this application a suitable initial state is one in which there are no tasks to do and the task handlers are available to be assigned a task. In this initial state, the receipt of a request signal from each task handler is required before a task will be assigned. In operation, for each Done signal received, a grant signal is issued, until N grants are outstanding. When a Done signal is received and N grants are outstanding, the Sharing arbiter waits until a request signal is received before responding to the Done signal by issuing another grant. In the trivial case where N=1, the Sharing arbiter reduces to a conventional arbiter arbitrating the assignment of tasks to task handlers and is unable to accept additional tasks until a pending task has been assigned. More detailed descriptions of these two applications are presented below.

Figure 4A:
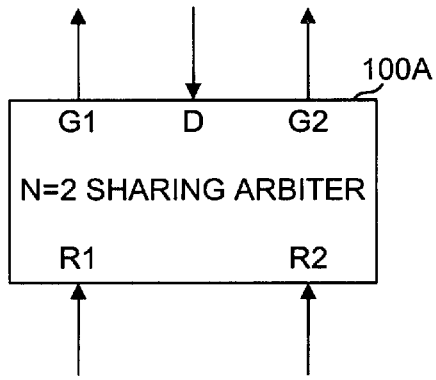
FIGS. 4A–4C are block diagrams of three instances of a Sharing arbiter according to one embodiment of the present invention.
Figure 5A:
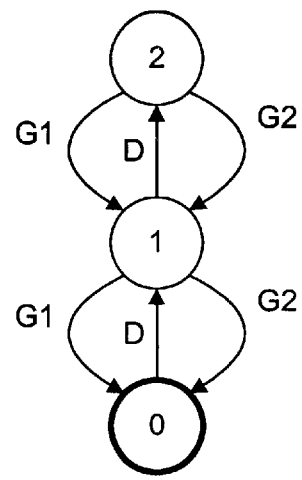
FIGS. 5A–5C are state diagrams with an alphabet of grants and Done signals for the Sharing arbiters of FIGS. 4A–4C, respectively.
Figure 4B:
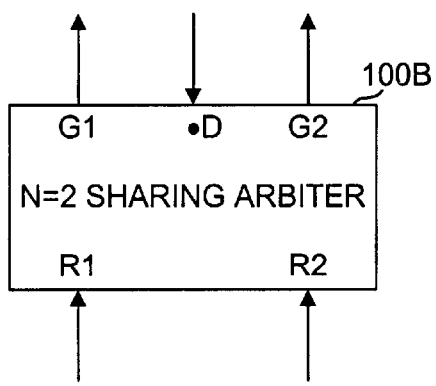
Figure 5B:
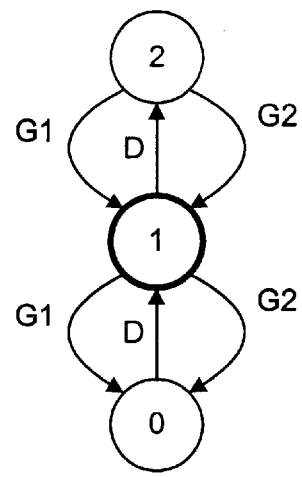
Figure 4C:
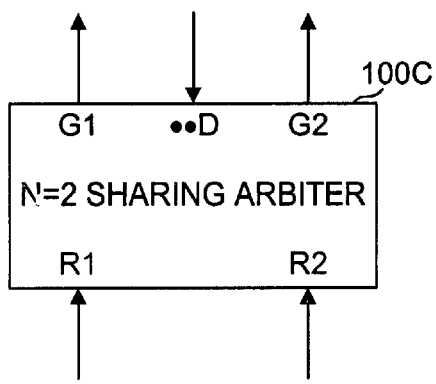
Figure 5C:
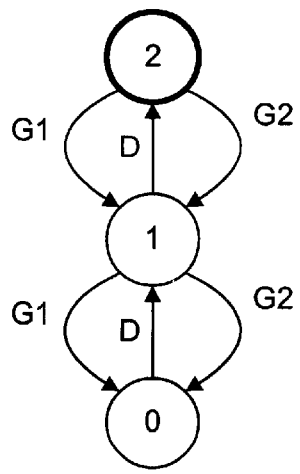

N=2 Sharing arbiters and their corresponding state diagrams are shown in FIGS. 4A–4C and 5A–5C. FIG. 4A shows a Sharing arbiter 100A with N=2 and an initial state that permits two Done signals to be received before a grant signal must be issued, where the arbiter will not issue a grant signal until at least one Done signal is received. This might be used with the task handler example described above. FIG. 5A is a state diagram showing just the grant and Done signals for Sharing arbiter 100A. FIG. 4B shows a Sharing arbiter 100B with N=2 and an initial state that permits one Done signal to be received before a grant signal must be issued, where the arbiter permits one grant signal to be issued before a Done signal must be received. FIG. 5B is a state diagram showing just the grant and Done signals for Sharing arbiter 100B. FIG. 4C shows a Sharing arbiter 100C with N=2 and an initial state that permits no Done signals to be received before a grant signal is issued, where the arbiter will issue two grant signals before a Done signal is required. A Sharing arbiter with this initial state might be used with the resource sharing example described above. FIG. 5C is a state diagram showing just the grant and Done signals for Sharing arbiter 100C. Although each input of Sharing arbiters 100A–100C are shown as single lines for each input and output, these lines may in fact each be implemented by multiple wires with an appropriate event encoding scheme as described, for example, in Sutherland.

Each of the Sharing arbiters 100A, 100B, 100C are interchangeable, requiring only a change in the state of the Sharing arbiter, where different states represent different numbers of received Done signals (or initialization of a Sharing arbiter to a state it would be in if Done signals were received). The initial state of the Sharing arbiter is indicated by the number of dots adjacent to the Done terminal. In general, the initial state for each input is indicated by a dot or dots adjacent to that input terminal. The initial state is indicated in the state diagrams by a state circle shown bolder than the other state circles. Thus, state 0 is the initial state for Sharing arbiter 100A. In FIGS. 5A–5C, the state labels "0", "1" and "2" have been chosen to correspond to the number of grants which can be issued from that state without an intervening Done signal.

U.S. Pat. No. 6,072,805 issued to Molnar, et al. (hereinafter "Molnar" and incorporated by reference herein for all purposes) describes an "Observing arbiter" which allows requests to pass an arbiter without delay so that a system using the requests can proceed while the arbiter is making a decision as to an order in which of multiple competing requests are to be granted. When an Observing arbiter is combined with a Sharing arbiter, the resulting Sharing/Observing arbiter can accept more than one request from a single requester and therefore issue more than one grant to that single requestor in the absence of an intervening Done signal from that requester. While it may appear that a second Done signal could be misinterpreted as an undoing or "reneging" of a first Done signal, the queue in the Sharing arbiter handles multiple Done signals without reneging.

Figure 6:
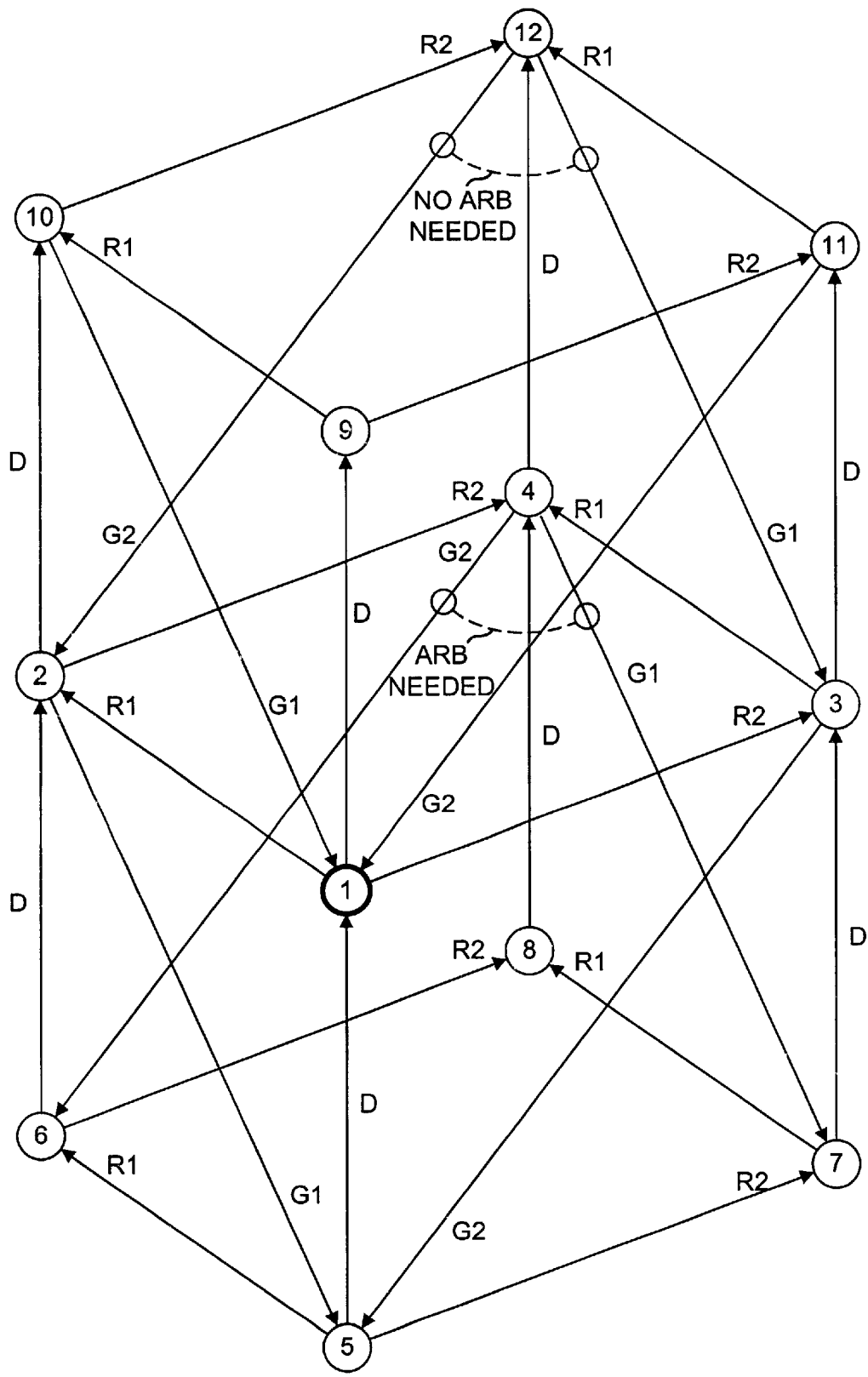
FIG. 6 is a state diagram for the Sharing arbiter of FIGS. 4B and 5B with an alphabet of grants, requests and Done signals.

As is explained below in connection with FIG. 7, et seq., a Sharing arbiter can be implemented by adding a queue at the Done input of a Sequencer arbiter. First, the state diagram of an N=2 Sharing arbiter shown in FIG. 6 will now be described. As shown in FIG. 6, the N=2 Sharing arbiter has twelve principle states. The bold circle identifies state 1 as being the initial state. This means that FIG. 6 is a state diagram for Sharing arbiter 100B shown in FIG. 4B; modification of FIG. 6 to be a state diagram for Sharing arbiter 100A or 100C involves making state 5 or state 9, respectively, the initial state. The projection of the state diagram of FIG. 6 onto the alphabet {G1, G2, D} results in the state diagram of FIG. 5B.

When the Sharing arbiter receives request signals or Done signals, or issues grant signals, it changes state. Since there are two requesters ("1" and "2") and up to two grants can be issued concurrently, arbitration among two competing requests is needed only in the situation when one Done signal has been received and two requests have been received (state 4). In this state, the Sharing arbiter operates as a conventional arbiter, enforcing mutual exclusion between grants G1 and G2 such that either a G1 or G2 is issued but not both. In states 5, 6, 7 and 8 no arbitration is needed because no grants are permitted. In states 10, 11, 2 and 3 arbitration is also not needed, since in these states only a single request has been received and a single grant signal can be issued to the requestor. In state 12 arbitration is also not needed. Specifically, from state 12, when both an R1 and an R2 and two Done signals have been received, grants G1 and G2 can both be issued concurrently; event G1 followed by event G2 then results in state 5, as does event G2 followed by G1. However, from state 12, two consecutive G1 grant events are not permitted without an intervening request signal R1 (this state diagram specifies that the arbiter is not an "Observing arbiter" also, as this would permit multiple requests on a given channel and thus multiple requests on that same channel without intervening Done signals).

Figure 7:
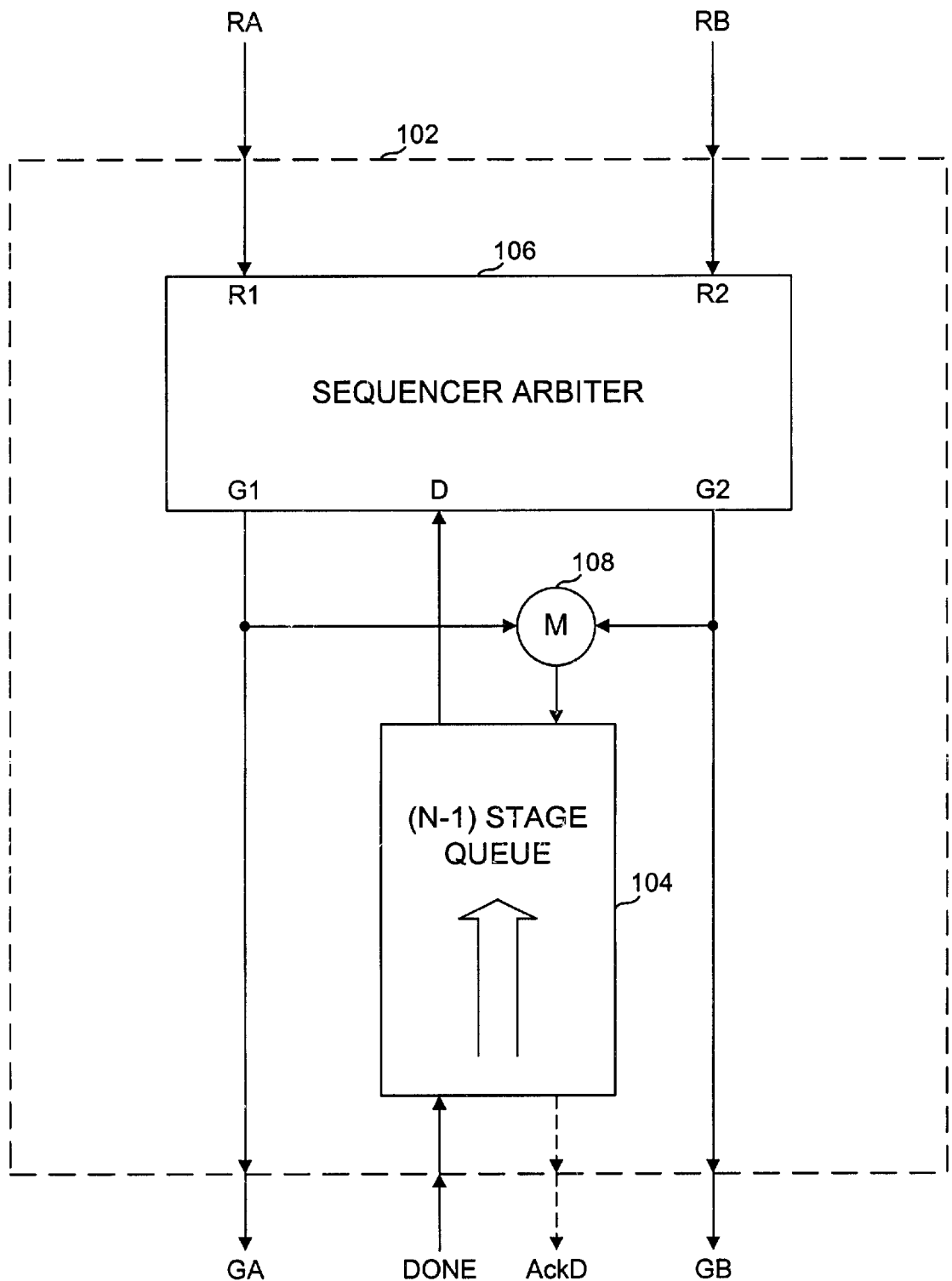
FIG. 7 is a block diagram of a Sharing arbiter constructed from a Sequencer arbiter and a queue.

Referring now to FIG. 7, a Sharing arbiter 102 is shown, implemented with a Sequencer arbiter 106 and an event queue 104. Event queue 104 has N−1 stages, where N is the Sharing-number of Sharing arbiter 102. The 2-Sharing arbiters shown in FIGS. 4A–4C can be implemented by the Sharing arbiter of FIG. 7 with a one stage queue for event queue 104. Event queue 104 is shown with an arrow to indicate the direction of event flow.

Each Done signal that exits from queue 104 is supplied to the Done input D of the Sequencer arbiter 106. For each grant signal, G1 or G2, issued by the Sequencer arbiter, the Done signal supplied by the event queue 104 is acknowledged by a signal output from merge element 108. A merge element is an element that receives signals at a plurality of inputs, and outputs a signal at a merge output for each signal received at any one of the inputs. A merge element is well known to those familiar with the design of asynchronous circuits. Merge element 108 is shown with two inputs, one each coupled to the two grant wires of Sequencer arbiter 106. The output of merge element 108 is coupled to queue 104, thereby advancing event queue 104 each time any grant signal is issued. The initial state of Sharing arbiter 102 is determined by the number of Done signals preset into Sequencer arbiter 106 and event queue 104. One possible initial state or condition has a queue full of N−1 Done signals and a preset D input of Sequencer arbiter 106. The other N possible initial states involve storing from 0 to N−1 Done signals in event queue 104, and also not presetting the D input of Sequencer arbiter 106.

In several queues shown in the figures, the Done signals enter the queue at one end and exit at the other end. Thus, the queues are FIFO (first-in, first-out) buffers. Since any Done signal is interchangeable with any other, the queue need not be a FIFO. The queue can be a LIFO (last-in, first-out) queue (a stack), or a counter (since only the number of Done events stored matters). Nonetheless, a FIFO queue is often preferred, due to its simplicity. Strictly speaking, a FIFO has the capability to transport data through the FIFO stages, so all that is really needed is the control chain of a FIFO queue to implement the Done queue from a FIFO circuit. The Done queue, in effect, operates as a distributed counter (of Done events).

Sharing arbiter 102 provides an optional acknowledgment signal, AckD, from event queue 104, which can be used by the environment of Sharing arbiter 102 to ensure that a Done signal is not sent to event queue 104 unless there is space in event queue 104 to accept it. The AckD signal is not needed if the environment is such that the number of Done signals sent by the environment in excess of the number of grant signals received by the environment would not exceed the capacity of event queue 104. However, if the environment is not configured for a specific Sharing-number or the Sharing-number of the Sharing arbiter is not known to the environment, then the preferred use of the AckD signal prevents the sending of a Done signal from the environment to Sharing arbiter 102 when event queue 104 is full. If the optional AckD output signal is used, Sharing arbiter 102 is delay insensitive at its terminals. This allows it to be used in an environment that has arbitrary delays on all the input and output signals, and the Sharing arbiter will still operate correctly. Without the AckD signal, Sharing arbiter 102 will be delay insensitive only if it is used in environments that know the Sharing-number of the Sharing arbiter and so know when the environment is permitted to send a Done signal, thus never sending a Done signal when event queue 104 is full.

From the perspective of the Sequencer arbiter 106, the G1 and G2 grants are issued sequentially, with an intervening Done signal D always being required. However, from a perspective external to the Sharing arbiter 102, when the Done signals have been sent, its grant signals GA and GB can be considered to be issued concurrently. In other implementations of a Sharing arbiter, GA and GB can actually be issued concurrently, internally as well as from an external perspective.

Although each signal line in FIG. 7 is shown as a single line and using single-wire transition signaling, each line may in fact be implemented by multiple wires as shown by Sutherland using the "Three-wire" event signaling.

Figure 8:
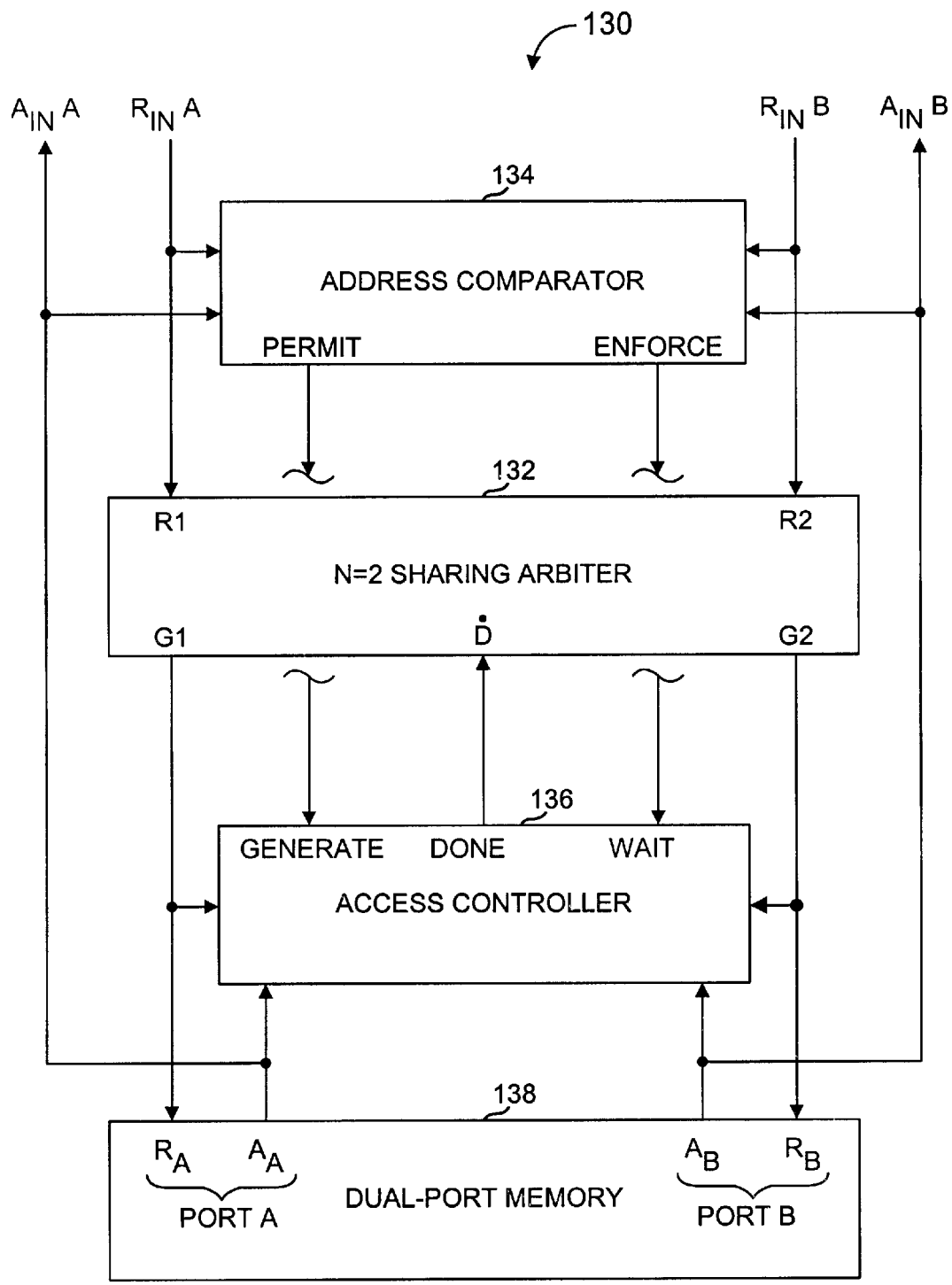
FIG. 8 is a block diagram of a dual-port memory system using an N=2 Sharing arbiter to control access to a dual-port memory.

Referring now to FIG. 8, an example of a Sharing arbiter application using Sharing arbiter 102 of FIG. 7 or other Sharing arbiters in the configuration of FIGS. 4B, 5B. FIG. 8 shows a dual-port memory system 130 that uses a Sharing arbiter 132, an address comparator 134 and an access controller 136 to control access to a memory 138. The memory 138 is a dual-port memory divided into several banks such that access to different banks can safely be carried out concurrently, requiring only that access to the same bank be sequential. The Sharing arbiter in this basic example provides improved performance over a conventional arbiter when sequential access to arbitrary addresses in the same bank of the memory is permitted and concurrent access of different banks in the memory provides a performance advantage.

The initial state of Sharing arbiter 132 is chosen such that it can issue only a single grant signal. The input requests $R_{in}A$, $R_{in}B$ (for access to memory 138) are fed directly to the request terminals R1 and R2 of Sharing arbiter 132, which then can issue a single grant, either G1 or G2. Address comparator 134 monitors the input requests ($R_{in}A$, $R_{in}B$) and the acknowledge signals ($A_{in}A$, $A_{in}B$) from the memory, and issues either a "permit" signal or an "enforce" signal. The "enforce" signal is issued if address comparator 134 determines that the two request inputs are for the same bank within memory 138, in which case sequential access to memory 138 needs to be enforced. If the requests are for different banks, address comparator 134 will issue a "permit" signal, allowing concurrent access to memory 138.

The "permit" and "enforce" signals are supplied to access controller 136 at its "generate" and "wait" inputs, respectively. If the permit signal is received, at the generate input of the access controller then, it generates a signal at its Done output, which is coupled to the Done input of Sharing arbiter 132. The Done signal permits a second grant signal to be issued by Sharing arbiter 132, and thus concurrent access to memory 138. In the other case, where address comparator 134 issues the enforce signal, access controller 136 waits until memory 138 acknowledges the present user, by signal $A_A$ or $A_B$, before issuing the Done signal to the Sharing arbiter 132.

Referring now to FIGS. 9–12, an application of an arbiter to assign tasks among a plurality of task handlers, which are processors in this example, is presented. The problem addressed in this application is how to dynamically assign tasks from one or more task sources to two or more processors such that the next available task is assigned to an available processor. In a synchronous, fully-clocked system, a circuit solution to the assignment task is quite straightforward: combinational logic can be used to determine the number of tasks available and the number of free processors, and can be used to assign the tasks to the processors, all within 1 clock cycle—a period when all the information needed to make the decisions is stable. However, in a non-clocked, asynchronous system, the arrival of the tasks and the availability of the processors can occur at any time, and the circuit employed to carry out the task assignment must be able to handle these asynchronous events in an efficient manner. Arbitration is required in this task, to ensure that clean decisions are made.

Figure 9:
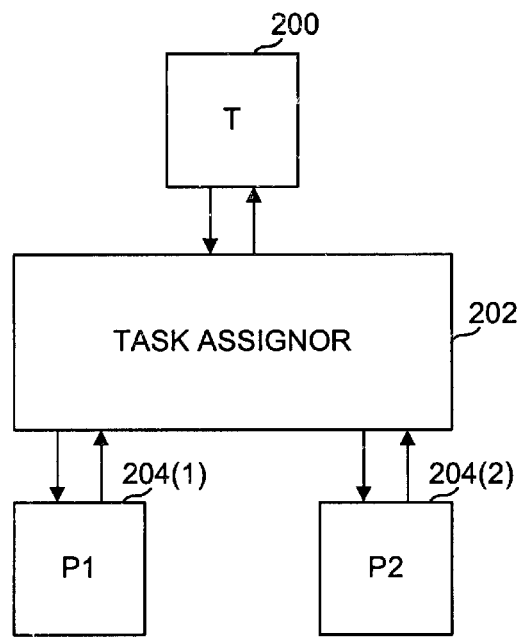
FIG. 9 is a block diagram of a task assignment system.

FIG. 9 shows the general concept of task assignment by a block diagram of a task assignment system. In that system, a task source 200 signals a task assignor 202 when a task is to be assigned, and task assignor 202 assigns the task to one of multiple task handlers 204 when a task handler 204 is available. FIG. 9 shows one task source 200 and two task handlers, 204(1) and 204(2), but more than one task source and more that two task handlers 204 might be used. When a task is assigned to a task handler and the task is complete, the task handler signals task assignor 202 so that a further task can be assigned to it. FIG. 9 shows a pair of signal lines, one in each direction, connecting to task assignor 202 from each of task source 200 and task handlers 204. The pair of signal lines allows for request/acknowledge signaling.

Figure 10:
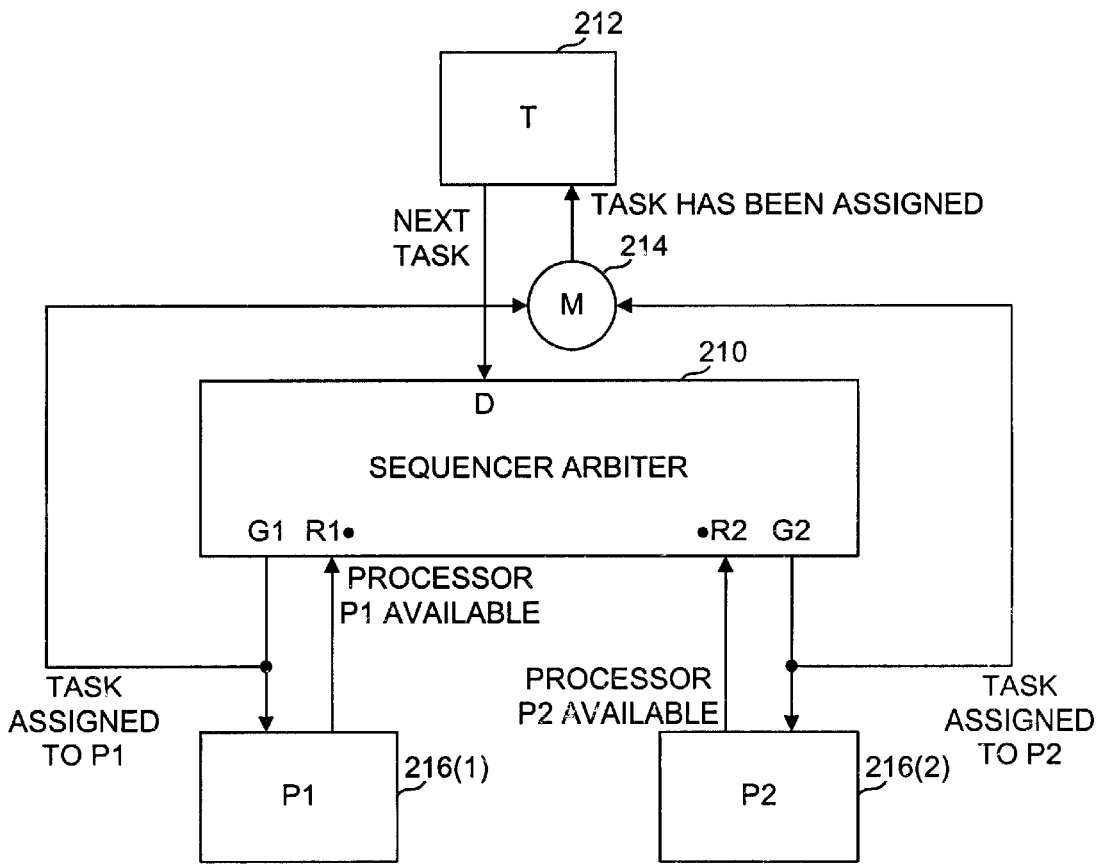
FIG. 10 is a block diagram of a task assignment system using a Sequencer arbiter.

A more specific version of the task assignment system of FIG. 9 is shown in FIG. 10. In the system of FIG. 10, a Sequencer arbiter 210 is used to assign tasks from a task source 212. The tasks are assigned to one of two processors 216, which are individually shown as processor 216(1) and processor 216(2). In a suitably chosen initial condition for this system, both processors are available and there are no tasks yet to be assigned. This initial condition is indicated by two dots, one beside the R1 input of Sequencer arbiter 210 and one beside the R2 input of Sequencer arbiter 210.

When the next task becomes available, task source 212 announces it by an event on the D input of Sequencer arbiter 210. Sequencer arbiter 210 decides which processor 216 to assign the task to and issues a single grant signal on either G1 (if processor 216(1) was selected) or G2 (if processor 216(2) was selected). The grant signal is sent to the selected processor and is also fed back to task source 212 via merge element 214 to signal that the task has been assigned. FIG. 10 includes labels by each signal line to indicate the significance of the message conveyed by an event on that signal line. Thus, processors 216 announce to Sequencer arbiter 210 that they are available, and are acknowledged with a message from Sequencer arbiter 210 that they have been assigned a new task. Task source 212 announces to Sequencer arbiter 210 the message "next task" and receives back an acknowledgment message announcing that the "task has been assigned". Using this system shown in FIG. 10, a task assignment system using a Sequencer arbiter results in sequential assignment of consecutive tasks.

Figure 11:
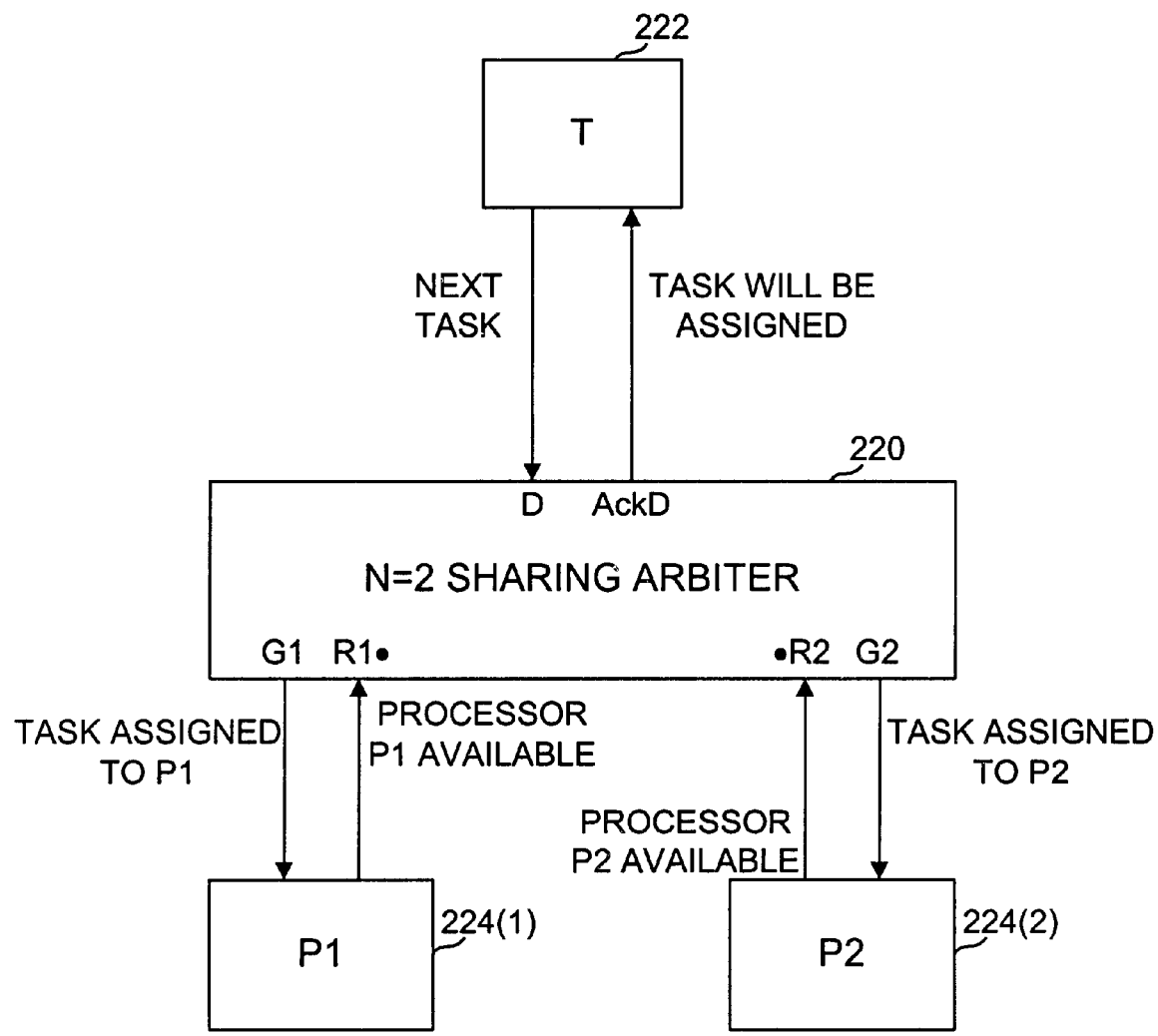
FIG. 11 is a block diagram of a task assignment system using a Sharing arbiter.

FIG. 11 is a block diagram of a task assignment system using a Sharing arbiter. There, a Sharing arbiter 220, with a Sharing-number of N=2, is used to assign tasks from a task source 222 to one of two processors 224, individually shown as processor 224(1) and processor 224(2). As shown in FIG. 11, like the system of FIG. 10, the initial conditions have been chosen such that both processors are available and there are no tasks yet to be assigned. This is indicated by the dot beside each of the request inputs of the Sharing arbiter. The messages between the processors and the task assignor are the same as with the system of FIG. 10, but the messages to task source 222 are slightly different, as the acknowledgment message in response to a "next task" signal is not that the "task has been assigned" but that the "task will be assigned". The latter message reflects the internal storage in Sharing arbiter 220.

When the internal storage location is empty, the "task will be assigned" message will be returned sooner than the corresponding "task has been assigned" message in the system of FIG. 10. Because of this, task source 222 can start generating the next task concurrently with the Sharing arbiter's decision-making process deciding on which processor to assign the task. A second "next task" message may be sent to Sharing arbiter 220. If both processors 224 are available, Sharing arbiter 220 can then assign the two tasks to both processors 224 concurrently; i.e., grant signals G1 and G2 can be issued concurrently without an intervening Done signal, D.

The advantage of the N=2 Sharing arbiter of FIG. 11 over using just a Sequencer arbiter is achieved by pipelining. In the situation when two tasks are to be assigned and both processors are available, the assignments can both be carried out concurrently. In particular, the task source can start the process of generating the next task before receiving confirmation that the first task has been assigned. If just a Sequencer arbiter is used as in FIG. 10, then the task source must wait until after the first task has been assigned before it is permitted to start generating the next task.

The "Sharing" property occurs when two consecutive tasks are assigned concurrently without an intermediate D input event, as explained above. For this reason a Sharing arbiter could also be thought of as a "Stacking arbiter", since the "next task" events are stacked up until a processor becomes available. The Sharing arbiter might also be thought of as an "Occasional arbiter", since arbitration is not always necessary. In fact, it is particularly advantageous to use a Sharing arbiter in applications where arbitration is only occasionally required.

Figure 12:
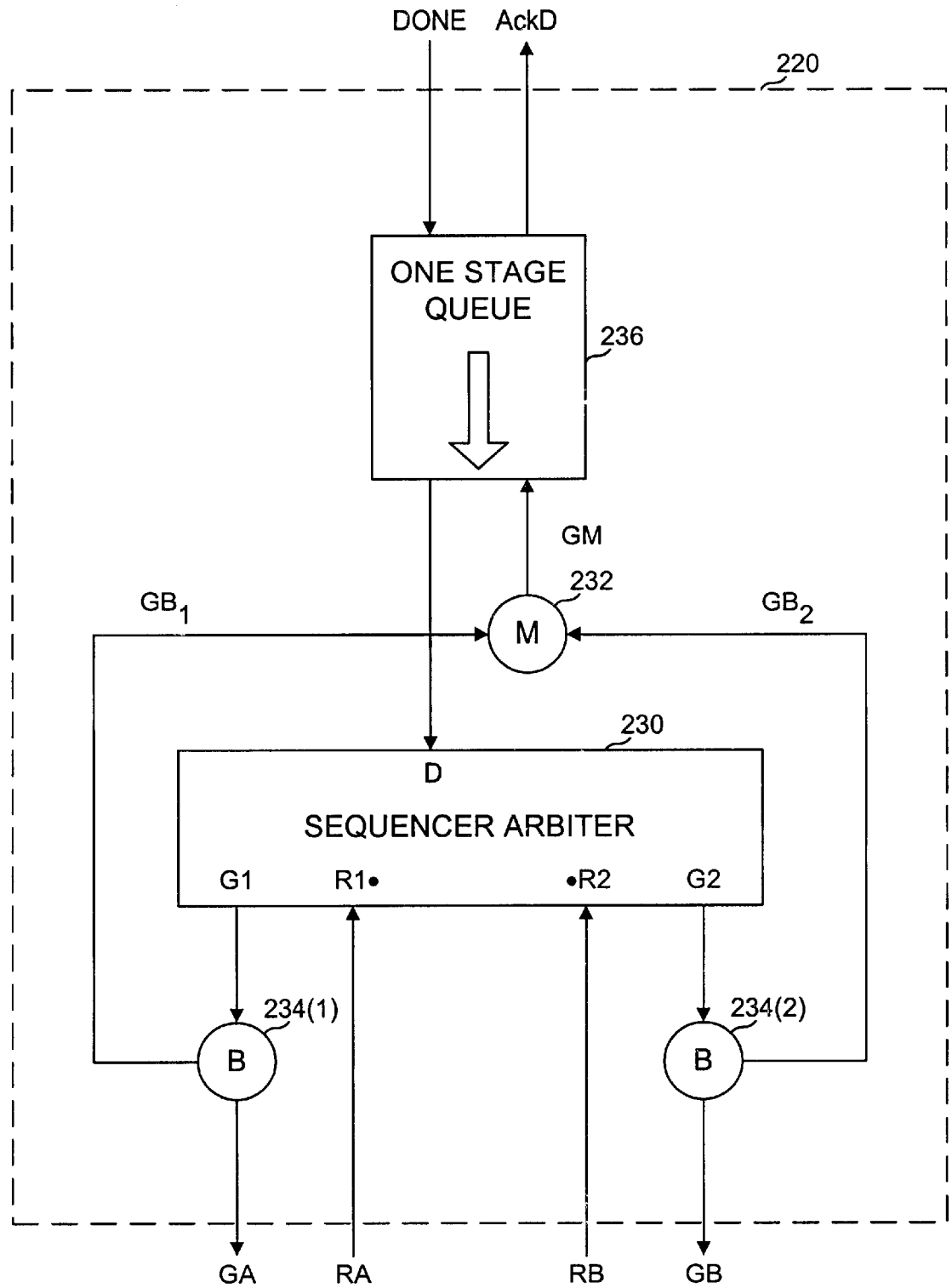
FIG. 12 is a block diagram showing an implementation of the Sharing arbiter of FIG. 11.

FIG. 12 is a block diagram showing an implementation of Sharing arbiter 220. Sharing arbiter 220 is shown comprising a Sequencer arbiter 230, a merge element 232, two branch elements 234 and a queue 236 having one stage. Sharing arbiter 220 in FIG. 12 is an N=2 instance of Sharing arbiter 102 shown in FIG. 7, since Sharing arbiter 220 uses a one stage queue. The branch elements 234 receive a signal input and produce a copy of the signal on each of their outputs. Branch elements are often not drawn in circuits, but instead are shown as wires that are connected together. In asynchronous circuits, where delay-insensitivity is desired, even if drawn as connected wires, the branch elements are implied. Their significance is that there are usually different delays on each of the output signals. Branch elements 234 are implied in FIG. 7.

The particular implementation of an N=2 Sharing arbiter shown in FIG. 12 arbitrates every input request, though arbitration need not be carried out for every request (see, for example, the state diagram of FIG. 6). When queue 236 is full, arbitration is not needed, as that condition corresponds to having received two consecutive D inputs. However, from the perspective of the grant signals GA and GB of Sharing arbiter 220, even though internally G1 and G2 are issued sequentially, the external grant signals GA and GB at times will be observed as being issued concurrently. Because of this, the internal arbitration is not always externally evident.

Sharing arbiter 220 is an N=2 Sharing arbiter, since queue 236 has one stage; but interestingly, under certain delay circumstances, Sharing arbiter 220 can behave as an N=3 or N=4 Sharing arbiter.

The GA and GB output wires provide dynamic storage and, for example, the N=4 feature appears when the delays on the GA and GB output wires are large compared to the delays from branch elements 234, via merge element 232, to queue 236. In this situation, the internal Sequencer arbiter 230 can make two consecutive decisions, and issue a G1 signal and a G2 signal, each of which is fed back internally to take another event from queue 236, thus permitting up to four D events to be sent to Sharing arbiter 220 before an output event is issued on either of the GA and GB output wires.

In the opposite extreme of these delay conditions, the internal feedback delays are large compared to the delay in issuing either a GA or GB output event. Sharing arbiter 220 then behaves as a Sharing arbiter with a maximum N of two. This is because, where either a GA or GB output signal occurs before the internally merged GM signal causes a fetch of the next event from queue 236, at most two D events will be sent to Sharing arbiter 220 before an event occurs on either of the GA and GB output wires. Thus, the Sharing arbiter implementation shown in FIG. 12 can be characterized with a Sharing-number of $2 \leq N \leq 4$, depending on the relationship between the internal feedback delays and the delays to issue a GA or GB output event.

Dynamic storage on the GA and GB output wires would permit an N=1 Sharing arbiter, i.e., one with no internal queue, to act as a $1 \leq N \leq 3$ Sharing arbiter; but since the arbiter could only guarantee a Sharing-number of one, the preferred embodiment uses a queue or equivalent element to ensure a Sharing-number of at least two.

Figure 13:
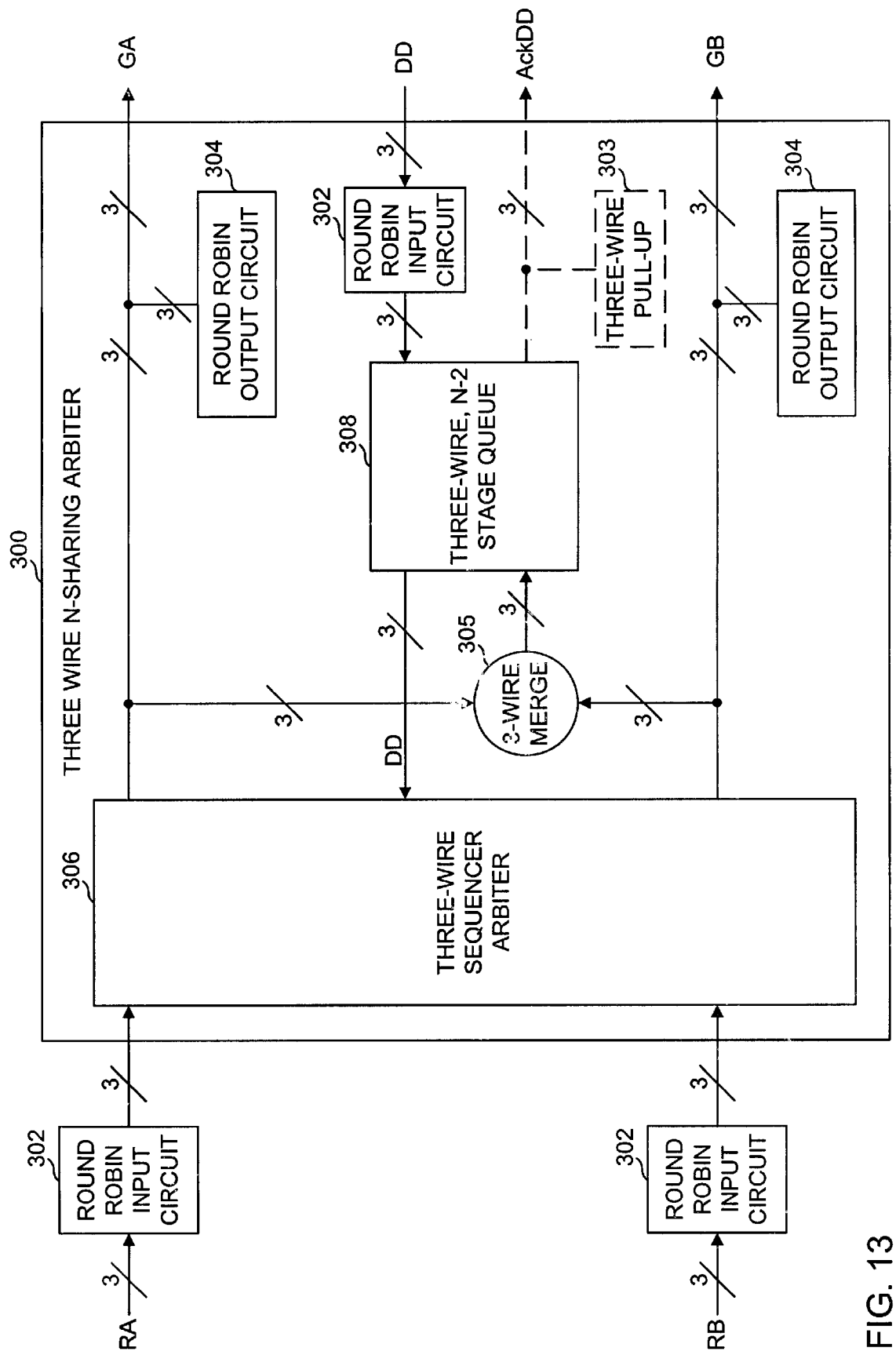
FIG. 13 is a block diagram of a Three-wire Sharing arbiter.

FIG. 13 illustrates another possible implementation of an N=2 Sharing arbiter which uses the three rail arbiter circuit shown in FIG. 4 of Sutherland. In this implementation, a request is signaled by a transition on one of three lines ("wires") from a COLD state to a HOT state. "COLD" and "HOT" are used so as not to limit the example to any particular voltage or current levels. The three wires have a defined order. With ONE-HOT logic, one of the three wires is HOT and an event is signaled by the wire following the HOT wire going HOT (the previously HOT wire will go COLD sometime thereafter, but its timing is not critical). With TWO-HOT logic, two wires are HOT and one is COLD and an event is signaled by the COLD wire going HOT (followed sometime thereafter by the HOT wire two wires behind the transitioning wire going COLD).

FIG. 13 is a high-level block diagram of a Three-wire Sharing arbiter 300. If ONE-HOT encoding is used, a circuit such as round robin input circuit 302A (see FIG. 14) might be used as the round robin input circuit 302 shown in FIG. 13. Otherwise, if TWO-HOT encoding is used, a circuit such as round robin input circuit 302B (see FIG. 15) might be used. Likewise, the round robin output circuit 304 could be implemented by round robin output circuit 304A (FIG. 16) for ONE-HOT encoding and round robin output circuit 304B (FIG. 17) for TWO-HOT encoding.

Figure 14:
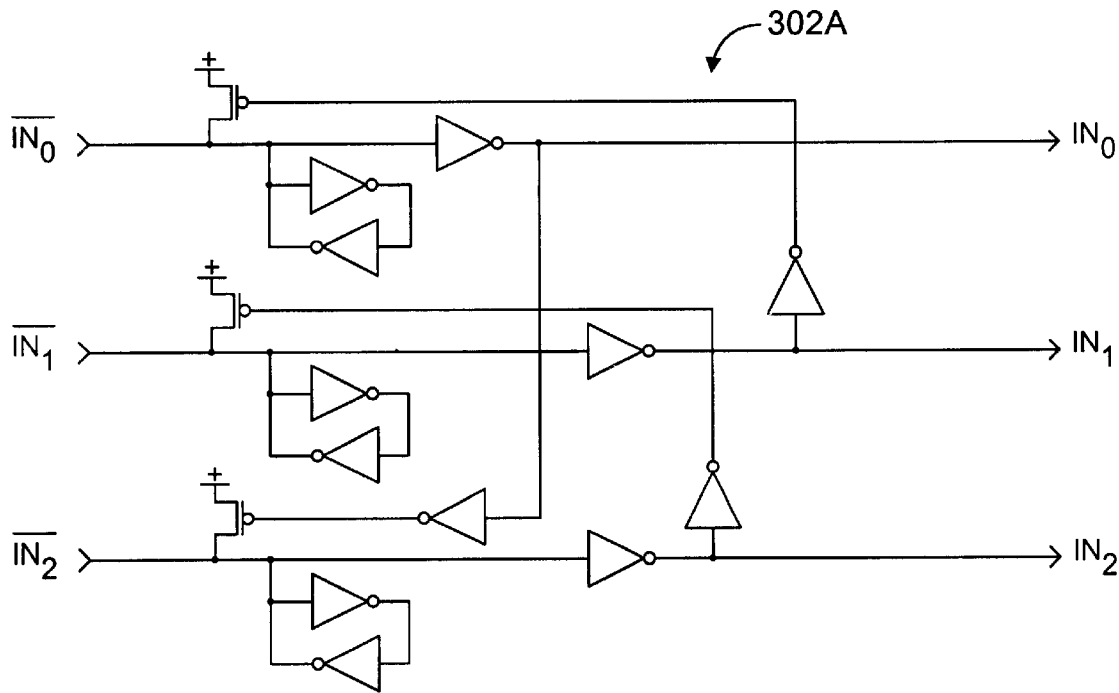
FIG. 14 is a schematic diagram of a round robin input circuit for use in circuits that signal using a "ONE-HOT" coding scheme.
Figure 15:
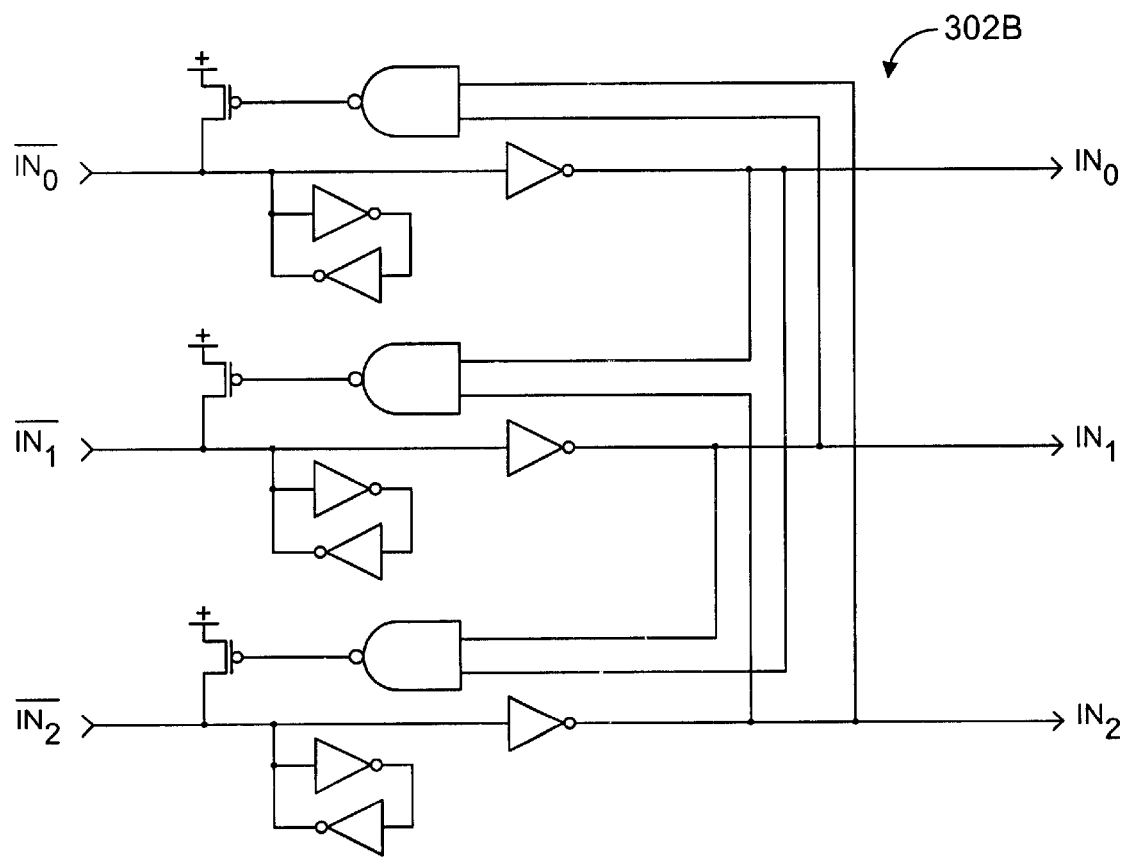
FIG. 15 is a schematic diagram of a round robin input circuit for use in circuits that signal using a "TWO-HOT, ONE-COLD" coding scheme.

The purpose of round robin input circuit 302 is to cause the HOT-to-COLD transition in the wires following the COLD-to-HOT transition that signaled an event. Thus, as can be seen in FIG. 14, when one input line goes HOT (in this figure HOT is "HI"), a pull-up transistor on the inverted input line of the previous wire turns on and that previous wire's input line (IN0, IN1 or IN2) goes LO (COLD). With TWO-HOT encoding, each input line is pulled cold when the other input lines are HOT. Round robin output circuits 304A, 304B operate in a similar manner, to cause an output wire to go COLD when another wire goes HOT (in the case of ONE-HOT encoding) or when the other two wires go HOT (in the case of TWO-HOT encoding).

Figure 16:
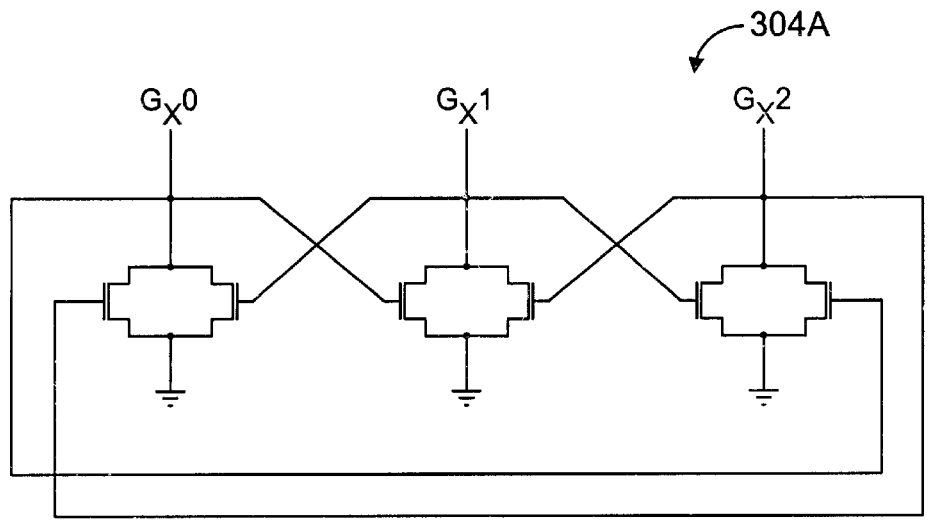
FIG. 16 is a schematic diagram of a round robin output circuit for use in circuits that signal using a "ONE-HOT" coding scheme.
Figure 17:
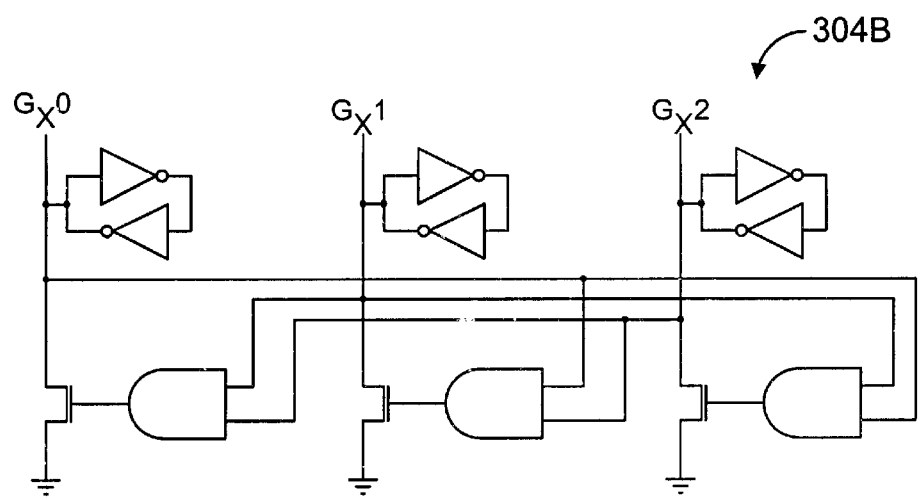
FIG. 17 is a schematic diagram of a round robin output circuit for use in circuits that signal using a "TWO-HOT, ONE-COLD" coding scheme.

A design for a ONE-HOT encoding round-robin output circuit is shown in FIG. 16. With the ONE-HOT encoding scheme, after the next wire in the sequence is driven HI, the round-robin circuit may start to drive the present wire LO. The round-robin circuit ensures that the present wire is LO before the third wire in the sequence is driven HI.

As shown in FIG. 13, Three-wire Sharing arbiter 300 includes a Three-wire Sequencer arbiter 306 and a Three-wire queue 308. Where a Three-wire queue is used, a Three-wire merge element 305 and a Three-wire pull-up 303 might also be used.

Figure 19:
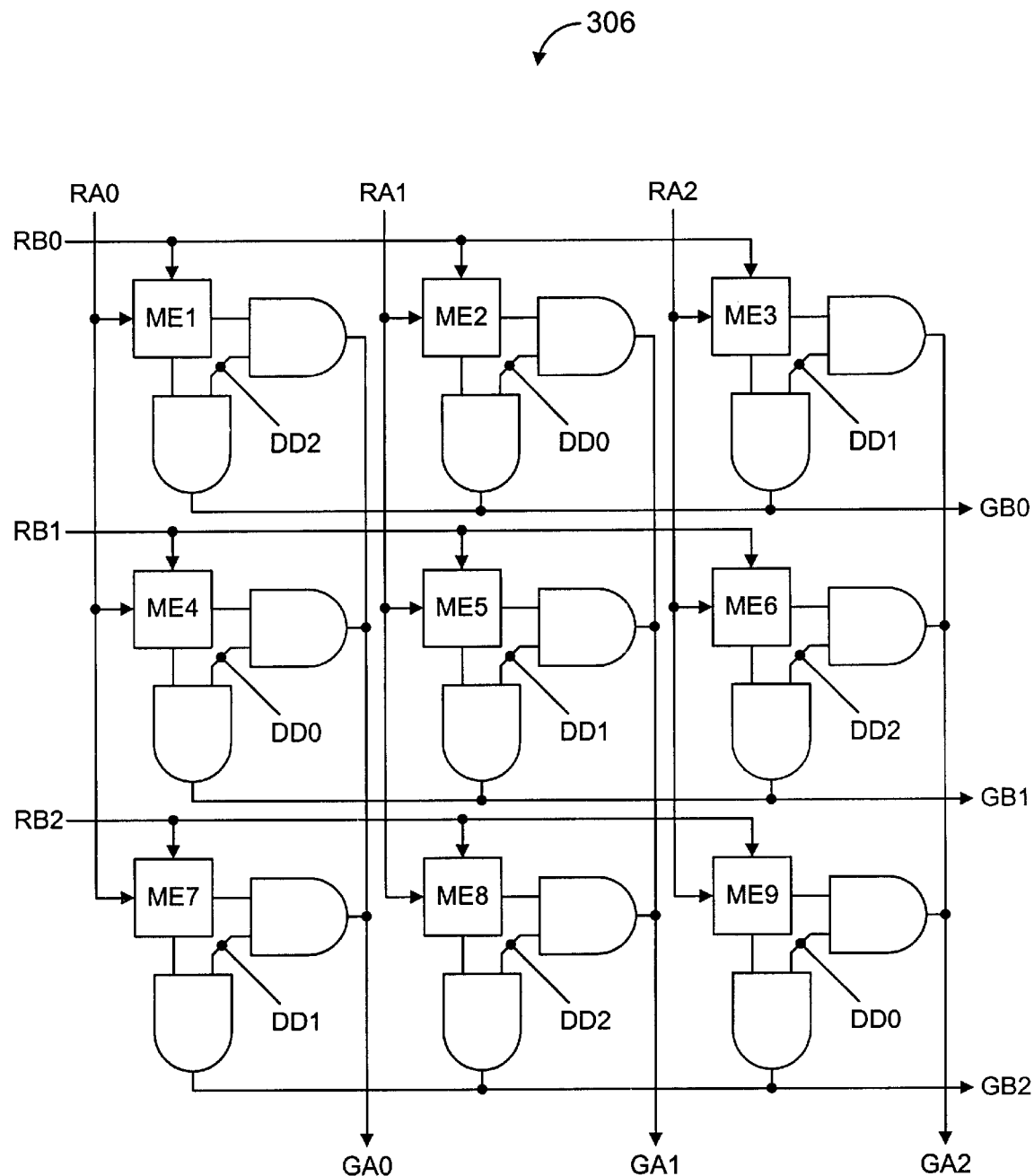
FIG. 19 is a block diagram of a Three-wire Sequencer arbiter.

Three-wire Sequencer arbiter 306 is shown in greater detail in FIG. 19. Arbiter 306 operates as described in detail in Sutherland. As shown in FIGS. 13 and 19, one request line, RA, has its three wires (RA0, RA1, RA2) coming in at the top of arbiter 306 and the other request line, RB, has its three wires (RB0, RB1, RB2) coming in from the left. Similarly, the grant line GA corresponding to request line RA exits at the bottom and the grant line GB corresponding to request line RB exits at the right. The three wires (DD0, DD1, DD2) of the Done line DD are interspersed as inputs to various AND gates. As shown in FIG. 13, these DD wires come from queue 308, which queues Done signals as described previously but here queues them for three wires.

Figure 18:
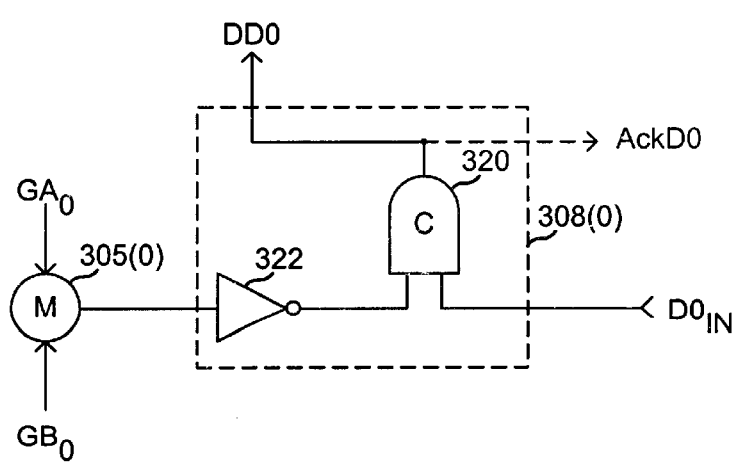
FIG. 18 is a schematic of a one-stage, one-wire queue structure.

FIG. 18 illustrates some of the details of three-wire queue 308. FIG. 18 is a schematic of the queue and merge element components for one wire and one stage of the queue. For Three-wire operations, three copies of the circuit of FIG. 18 would be used. As shown, merge element 305(0) merges the GA0 and GB0 signals into the input of a queue stage 308(0). Queue stage 308(0) is shown comprising a Muller-C element 320 and an inverter 322 to form a one-stage, one-wire queue.

The Three-wire arbiter circuit shown in detail in FIG. 19 can be used as an N=2 Sharing arbiter with a ONE-HOT signal encoding scheme. In that Three-wire arbiter circuit, a HI wire is a HOT wire. Suffixes 0, 1 and 2 appear in the input and output label names, indicating the sequence in which the wires become hot. Let the initial state of this circuit be one in which a Done signal has been received, but no requests have been received. This corresponds to inputs RA2, RB2 and DD2 all being HI, and all other inputs LO. With DD2 HI the outputs of mutual exclusion elements ("mutexes") ME1, ME6 and ME8 are enabled to drive the grant output signals, with ME6 driving GA2 HI and ME8 driving GB2 HI. All the other grant output signals are held LO by the round-robin output circuits shown in FIG. 13, and shown in more detail in FIG. 16.

Because the Three-wire arbiter can accept two Done signals (due to the Three-wire signal encoding scheme), that arbiter exhibits N=2 Sharing behavior. The N=2 Sharing behavior of this arbiter circuit can be seen when a second Done signal is sent, followed by an input request on both input channels concurrently. Receipt of the second done input, setting DD0 HI, enables ME2, ME4 and ME9 to drive the grant output signals. However, no output wire will change until an input request has been received. Input wire DD2 is now permitted to go LO. Arrival of an event on both input channels, as signaled by RA0 and RB0 being set HI, will result in mutexes ME2 and ME4 each receiving an uncontested input request. Thus, mutex ME4 will respond to input RA0 and cause GA0 to be driven HI signaling a grant on the A channel, and mutex ME2 will respond to input RB0 and cause GB0 to be driven HI signaling a grant on the B channel. Notice that both these grants can be issued concurrently.

As explained above, this circuit can issue two grant events concurrently without an intervening done event. Consequently, a Three-wire N-Sharing arbiter only needs an N−2 stage queue, as the Three-wire encoding effectively provides one additional queue stage. The outputs of the three AND gates driving output wire GA0 are wire ORed together such that a HI output on any one of these three AND gates will drive GA0 HI. Similarly, the three AND gates driving output wire GA1 are wire ORed together, and so are the three AND gates that drive GA2. These three output wires, GA0, GA1, and GA2, collectively form a first grant output from the arbiter and each grant signal is announced using the Three-wire signaling scheme described above. Similarly, the three AND gates that drive output wire GB0 are wire ORed together, as are the three AND gates that drive output wire GB1 and the three AND gates that drive output wire GB2. These three output wires, GB0, GB1, and GB2, collectively form the second grant output from the arbiter.

The circuit of FIG. 13 could be employed with a different environment as a 2-Observing, N=2 Sharing arbiter, because not only can it accept two consecutive Done signals and thus issue two grant signals concurrently, but it can also accept two consecutive requests on each of its two request channels. Examples of Observing arbiters are shown in Molnar. In Three-wire TWO-HOT encoding, two wires can be HOT, or HI, indicating the presence of two consecutive requests on one request channel. In this encoding, at least one wire must be COLD, or LO.

In summary, a new type of arbiter, the Sharing arbiter, has now been presented, along with its properties and examples of how one might employ Sharing arbiters. The Sharing arbiter complements other arbiter types, namely, conventional arbiters, such as the RGD arbiter and the Sequencer arbiter, as well as newly developed arbiters such as the Observing arbiter disclosed in Molnar. The Sharing arbiter can be employed in an environment where arbitration between two or more users requesting access to a common resource is sometimes necessary while at other times multiple users are permitted to "share" the common resource. The Sharing arbiter thus permits greater concurrency, resulting in potentially greater performance over conventional arbiters and Observing arbiters when employed in such an environment.

We have shown the application of a Sharing arbiter to the task assignment job. For this job, the Sharing arbiter offers performance advantages over conventional arbiters. As explained herein, if N events can be done simultaneously without conflict, the Sharing arbiter will issue up to N grants to allow the events to occur. In order to do this correctly, the Sharing arbiter keeps track of how many events are outstanding (or N minus the number of events outstanding). The preferred way to track events is using a queue of Done events, where a Done event is the receipt of a Done signal.

In this task assignment application, the Sharing arbiter is used to allocate a sequence of tasks or objects to multiple task handlers or recipients. The allocation is dependent upon the recipient's readiness to accept an object and upon the availability of the objects, such that if an object is available, then it will be delivered as soon as a recipient is ready to receive an object. Conventional methods for such task assignment operations tend to be much slower and less efficient, and are frequently biased to favor certain recipients. This is because either they conduct a poll and query each of the recipients as to their readiness to receive an object, resulting in the sequential delivery of objects. The Sharing arbiter can deliver objects concurrently when there are multiple objects available and several recipients ready to receive an object and so offers faster performance when operating in such an environment.

The foregoing has been a description of embodiments of the invention. It will be appreciated that numerous departures from the specific circuitry shown may be made without departing from the spirit of the invention, which is further defined in the appended claims and their equivalents.

What is claimed is:

1. An arbiter having a plurality of request inputs and a plurality of grant outputs, wherein each request input is paired with a grant output such that a grant signal is output at the paired grant output when a request signal is received at the paired request input and the arbiter selects that pair over other pairs for which request signals may have been received, the arbiter comprising:

at least one Done input for receiving a Done signal according to a Done signaling protocol indicating that an access granted by the grant signal in response to a request signal is complete; and a queue comprising a queue circuit for queuing up to N Done signals as they are received by the arbiter, where N is an integer greater than one and independent of the Done signaling protocol, thereby allowing the arbiter to receive up to N Done signals before issuing a grant signal.

2. The arbiter of claim 1, wherein the queue is an (N−1) stage FIFO queue.

3. The arbiter of claim 1, wherein the queue circuit is integral to the arbiter and the queue circuit comprises multiple arbitration elements coupled in a multiple-wire encoding arrangement.

4. The arbiter of claim 1, wherein the queue is configurable to an initial state wherein one or more Done signals are stored in the queue, thereby allowing more than one grant signal to be issued prior to receipt of a Done signal.

5. The arbiter of claim 4, wherein the number of grant signals which are issuable before a Done signal is received corresponds to a number of concurrent accesses which are permitted to a resource for which the arbiter is arbitrating accesses.

6. The arbiter of claim 1, wherein the arbiter includes a Sequencer arbiter.

7. The arbiter of claim 1, wherein the arbiter includes an Observing arbiter.

8. The arbiter of claim 1, wherein the arbiter includes a request-grant-done arbiter.

9. The arbiter of claim 1, wherein the at least one Done input comprises one Done input for each of the plurality of request/grant input/output pairs.

10. The arbiter of claim 1, wherein the signals are encoded as transition signals.

11. The arbiter of claim 1, wherein the signals are encoded on three wires using a ONE-HOT protocol.

12. The arbiter of claim 1, further comprising:

a resource with access limitations, coupled to the at least one Done input to indicate completion of an access;

a plurality of resource users, each coupled to one of the plurality of request inputs and a paired grant output and coupled to the resource; and logic, within each resource user, to refrain from accessing the resource until a grant signal is received on the paired grant output for said resource user.

13. The arbiter of claim 1, further comprising an object allocator, coupled to the at least one Done input to request an object allocation to one of a plurality of object recipients, wherein an object recipient of the plurality of object recipients accepts objects following the issuance of an object request signal from the object recipient.

14. The arbiter of claim 13, wherein the object allocator is a task allocator, the objects are tasks and the plurality of object recipients are processors capable of handling a predetermined maximum number of tasks at one time.

15. The arbiter of claim 14, wherein the predetermined maximum number of tasks that a processor can handle at one time is one.

16. The arbiter of claim 1, wherein the request inputs, grant outputs and Done input are Three-wire signal inputs/outputs and one stage of the queue is provided by a modified Three-wire protocol and N−2 stages are provided by the queue circuit.

17. The arbiter of claim 1, wherein K, M and P are positive integers, wherein the number of request inputs and the number of grant outputs are both K and M is the number of input requests received, wherein the arbiter is configured to 1) issue M grant signals concurrently if at least M Done signals have also been received, $M \leq K$ and $M \leq N$, 2) arbitrate among the M input requests to issue up to P grant signals concurrently if P Done signals have also been received, where $P<M$ and $P \leq N$, and 3) issue N grant signals concurrently if N Done signals have also been received and $M \geq N$.

18. The arbiter of claim 1, wherein the grant signals and done signals are encoded as level signals.

19. The arbiter of claim 1, wherein the grant signals and done signals are encoded on three wires using a TWO-HOT protocol.

20. The arbiter of claim 1, wherein the grant signals and done signals are encoded using a plurality of wires.

21. A method of arbitrating among a plurality of requests in an arbiter which receives request signals on request lines which are part of a plurality of request line/grant line pairs and grants a request received on a request line by issuing a grant signal on the request line's paired grant line, the method comprising the steps of:

receiving Done signals, wherein a Done signal indicates that an access granted by the grant signal is complete;

in response to receiving a Done signal when a request is pending, issuing a grant signal paired with the pending request;

in response to receiving a Done signal when a request is not pending, queuing the received Done signal in a queue; and in response to receiving a request when at least one Done signal is queued, removing a Done signal from the queue and issuing a grant signal representing a grant in response to the request.

22. The method of claim 21, wherein the steps of queuing and removing are performed on a queue that is a first-in, first-out (FIFO) buffer.

23. The method of claim 21, further comprising the steps of:

issuing M grant signals concurrently if at least M Done signals have also been received, $M \leq K$ and $M \leq N$, wherein K is the number of request inputs and the number of grant outputs and M is the number of input requests received;

arbitrating among the M input requests to issue up to P grant signals concurrently if P Done signals have also been received, where $P<M$ and $P \leq N$, and issuing N grant signals concurrently if N Done signals have also been received and $M \geq N$.

24. An arbiter having a plurality of request inputs and a plurality of grant outputs, wherein each request input is paired with a grant output such that a grant signal is output at the paired grant output when a request signal is received at the paired request input and the arbiter selects that pair over other pairs for which request signals may have been received, the arbiter comprising:

at least one Done input for receiving a Done signal according to a Done signaling protocol indicating that an access granted by the grant signal in response to a request signal is complete; and a counter for counting up to N Done signals as they are received by the arbiter, where N is an integer greater than one and independent of the Done signaling protocol, thereby allowing the arbiter to receive up to N Done signals before issuing a grant signal.

25. The arbiter of claim 1, wherein the counter is integral to the arbiter and the queue circuit comprises multiple arbitration elements coupled in a multiple-wire encoding arrangement.

26. The arbiter of claim 1, wherein the counter is configurable to an initial state wherein one or more Done signals are stored in the counter, thereby allowing more than one grant signal to be issued prior to receipt of a Done signal.

27. The arbiter of claim 26, wherein the number of grant signals which are issuable before a Done signal is received corresponds to a number of concurrent accesses which are permitted to a resource for which the arbiter is arbitrating accesses.

28. The arbiter of claim 24, further comprising:

a resource with access limitations, coupled to the at least one Done input to indicate completion of an access;

a plurality of resource users, each coupled to one of the plurality of request inputs and a paired grant output and coupled to the resource; and logic, within each resource user, to refrain from accessing the resource until a grant signal is received on the paired grant output for said resource user.

29. The arbiter of claim 24, further comprising an object allocator, coupled to the at least one Done input to request an object allocation to one of a plurality of object recipients, wherein an object recipient of the plurality of object recipients accepts objects following the issuance of an object request signal from the object recipient.

30. The arbiter of claim 29, wherein the object allocator is a task allocator, the objects are tasks and the plurality of object recipients are processors capable of handling a predetermined maximum number of tasks at one time.

* * * * *